United States Patent
Kitada

(10) Patent No.: US 8,044,360 B2
(45) Date of Patent: Oct. 25, 2011

(54) RADIATION DETECTOR

(75) Inventor: Makoto Kitada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/720,690

(22) Filed: Mar. 10, 2010

(65) Prior Publication Data

US 2010/0230607 A1    Sep. 16, 2010

(30) Foreign Application Priority Data

Mar. 12, 2009    (JP) .................. 2009-060065

(51) Int. Cl.
    *G01T 1/24*    (2006.01)
(52) U.S. Cl. .................. 250/370.08
(58) Field of Classification Search .......... 250/370.01, 250/370.08, 370.09, 370.14; 378/37
    See application file for complete search history.

(56) References Cited

U.S. PATENT DOCUMENTS

| | | | |
|---|---|---|---|
| 5,331,179 A * | 7/1994 | Lee et al. ............... | 250/591 |
| 5,563,421 A | 10/1996 | Lee et al. | |
| 5,614,722 A * | 3/1997 | Solberg et al. .......... | 250/374 |
| 6,215,123 B1 * | 4/2001 | Orava et al. ............ | 250/370.13 |
| 2005/0173774 A1 * | 8/2005 | Carlson .................. | 257/461 |
| 2006/0065841 A1 * | 3/2006 | Hietanen et al. ........ | 250/370.09 |
| 2006/0120010 A1 * | 6/2006 | Kameyama et al. ..... | 361/234 |
| 2007/0272870 A1 * | 11/2007 | Ishii et al. .............. | 250/370.08 |
| 2008/0224249 A1 * | 9/2008 | Nabe et al. ............. | 257/433 |
| 2008/0237770 A1 * | 10/2008 | Iwazaki .................. | 257/448 |
| 2009/0026382 A1 * | 1/2009 | Sakamoto et al. ...... | 250/370.09 |

FOREIGN PATENT DOCUMENTS

| | | |
|---|---|---|
| JP | 9-009153 A | 1/1997 |
| JP | 2001-053327 A | 2/2001 |
| JP | 3311273 B2 | 8/2002 |
| JP | 3818271 B2 | 9/2006 |

* cited by examiner

*Primary Examiner* — David Porta
*Assistant Examiner* — Marcus Taningco
(74) *Attorney, Agent, or Firm* — SOLARIS Intellectual Property Group PLLC

(57) ABSTRACT

The present invention provides a radiation detector that can suppress a deterioration of image quality of a radiation image while suppressing the size of the radiation detector. Namely, a conductive layer configured by a conductive member is disposed at a portion that corresponds to at least the back side of the peripheral edge portion of a bias electrode, on the surface of an insulating substrate.

8 Claims, 12 Drawing Sheets

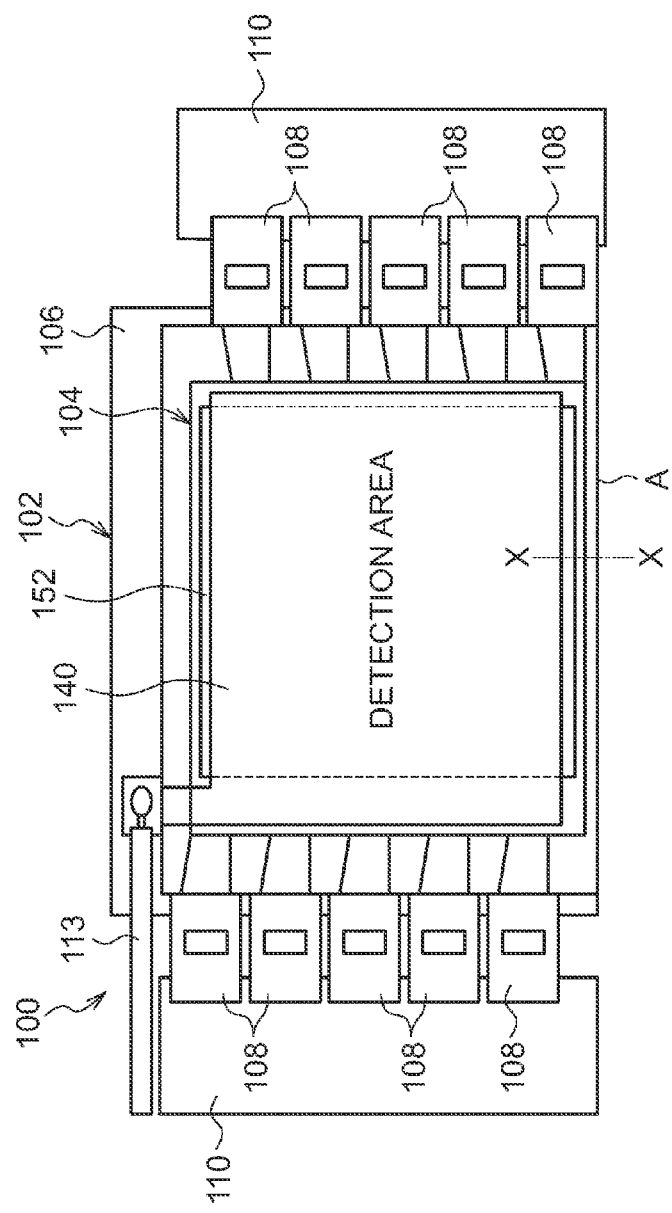
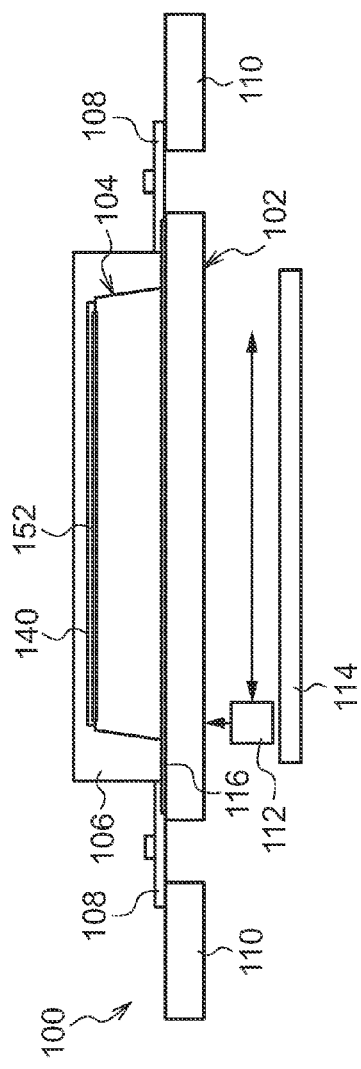
FIG.1A
FIG.1B

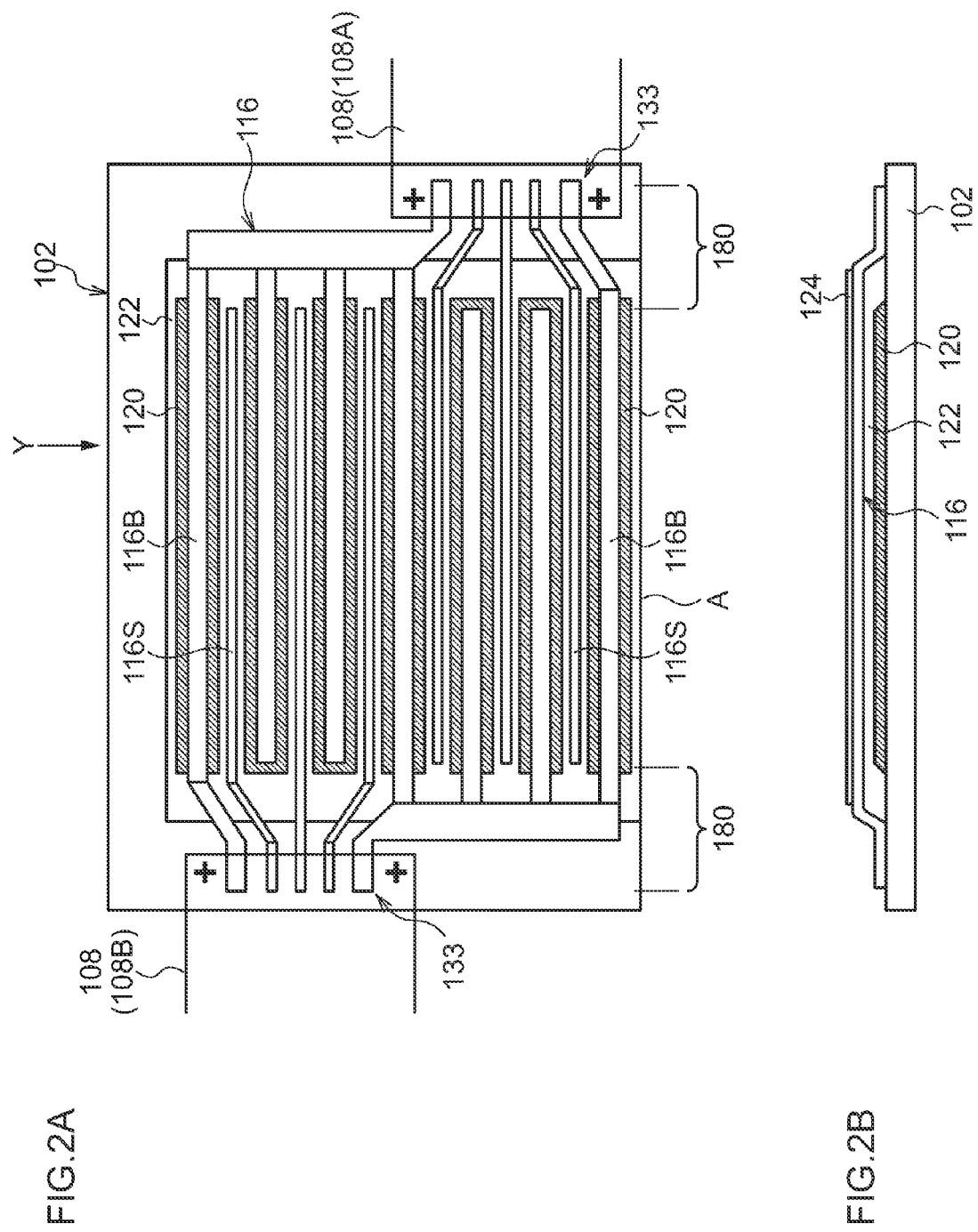

RADIATION DETECTOR

CROSS-REFERENCE TO RELATED APPLICATION

This application claims priority under 35 USC 119 from Japanese Patent Application No. 2009-060065, filed on Mar. 12, 2009, the disclosure of which is incorporated by reference herein.

BACKGROUND OF THE INVENTION

1. Field of the Invention

The present invention relates to a radiation detector used in, for example, a medical X-rays imaging apparatus.

2. Description of the Related Art

Recently, a radiation detector such as an FPD (Flat Panel Detector) capable of directly converting radiation to digital data, has come into practical use. The radiation detector has a merit in that it can confirm an image at once in comparison with a conventional imaging plate. The radiation detector having the merit has rapidly become widespread.

Various types of radiation detectors have been proposed. Among such radiation detectors, there is, for example, a direct-conversion-type radiation detector that directly converts radiation to charges by a semiconductor layer and that stores the charges. Further, there is an indirect-conversion-type radiation detector that converts radiation to light once by a scintillator such as CsI: Tl, and GOS (Gd 2O2S: Tb), then converts the converted light to charges by a semiconductor layer, and that stores the charges.

A radiation detector has a bias electrode which is disposed on one surface of a semiconductor layer, formed on an insulating substrate, and applies a bias voltage. Together therewith, the radiation detector has plural collecting electrodes which are disposed on the other surface of the semiconductor layer, that collect charges. The radiation detector causes the semiconductor layer to generate an electric field by applying a bias voltage to the bias electrode. Further, the radiation detector collects the charges generated in the semiconductor layer by the collecting electrodes, and reads out the charges as information representing a radiation image.

An electrostatic capacitance (so-called, parasitic capacitance) is generated in an insulating substrate by an electric field generated by applying the bias voltage to the bias electrode, and thereby charges are generated. The charges generated in the insulating substrate changes by a peripheral environment such as temperature and humidity, the bias voltage, and an application time in which the voltage are applied. The change of the electrostatic capacitance generated between the insulating substrate and the collecting electrodes affects reading of the charges. In particular, many collecting electrodes are disposed in periphery the central portion of the semiconductor layer of the insulating substrate, opposing with the bias electrode. Therefore, since charge amount generated is small, the image is less affected by charges. However, in an edge portion of the semiconductor layer of the insulating substrate, only a small number of collecting electrodes is disposed opposing with the bias electrode. Further, a wrap-around of the electric field also occurs in the edge portion of the semiconductor layer. Therefore, the charge amount generated is large, and the image may be affected by charges.

As a technique for suppressing an influence to an image due to the change of the electrostatic capacitance, Japanese Patent No. 3818271 discloses a technique for preventing a change of an electrostatic capacitance between a bias electrode and an upper cabinet that protects a radiation detector. In this technique, a sealed member composed of a nonconductive material is disposed on the upper portion of the bias electrode (opposite side of a semiconductor layer).

Further, Japanese Patent Application Laid-Open (JP-A) No. 2001-53327 discloses a technique for preventing noise generated in a signal line by a capacitor coupling. In the technique, guard electrodes are disposed, in the peripheral portion of the semiconductor layer, between signal lines to which signals of charges collected by collecting electrodes flow, and a semiconductor layer. The technique of JP-A No. 2001-53327 prevents the capacitor coupling between the semiconductor layer and the signal lines. Thus, in the technique of JP-A No. 2001-53327, the guard electrodes are formed between the signal lines disposed on the semiconductor layer side of a substrate and the semiconductor layer.

Further, Japanese Patent No. 3311273 discloses a technique for preventing occasion of a dielectric breakdown caused by applying a high voltage to collecting electrodes from a peripheral portion of a semiconductor layer, by disposing dummy electrodes at peripheral portions. In this technique, the dummy electrodes are formed around the collecting electrodes (on the semiconductor layer side of a substrate) to prevent the high voltage from being applied to the collecting electrodes from the peripheral portion.

However, the technique of Japanese Patent No. 3818271 can not suppress a deterioration of image quality due to the change of the electrostatic capacitance between the collecting electrodes and the insulating substrate.

Further, there is considered a configuration for preventing the change of the electrostatic capacitance by disposing guard electrodes between signal lines and a semiconductor layer in the peripheral portion of a semiconductor layer, and by disposing dummy electrodes in the peripheral portion of the semiconductor layer, as disclosed in JP-A No. 2001-53327 and Japanese Patent No. 3311273. However, when the electrodes are disposed on the semiconductor layer side of a substrate, the electrodes must be disposed externally away with a predetermined distance from the collecting electrodes of the peripheral portion, to prevent discharges between the electrodes and the collecting electrodes. As a result, the size of a radiation detector increases.

SUMMARY OF THE INVENTION

The present invention provides a radiation detector that can suppress a deterioration of image quality of a radiation image while suppressing an increase in the size of the radiation detector.

A first aspect of the invention is a radiation detector including: a substrate formed in a flat plate form and having a first surface provided with an insulating property; a plurality of collecting electrodes, disposed on the first surface of the substrate, that collects charges; a semiconductor layer, formed on the plurality of collecting electrodes, that generates charges when radiation is irradiated; a bias electrode, formed on the semiconductor layer, that applies a bias voltage for generating an electric field for moving charges having a polarity of a detection target among the generated charges, to the collecting electrodes; and a conductive layer, composed of a conductive member, disposed on a second surface of the substrate at a portion corresponding to a peripheral edge portion of the bias electrode.

The radiation detector of the present invention includes plural collecting electrodes, for collecting charges, disposed on one surface of a substrate which is formed in a flat plate form and at least one surface of which has an insulating property. A semiconductor layer is formed on the plural collecting electrodes for generating charges when radiation is irradiated. Further, a bias electrode is formed on the semiconductor layer that applies a bias voltage for generating an electric field for moving the charges that has a polarity of detection target among the charges generated to the semiconductor layer, to the collecting electrodes side.

Further, the radiation detector of the present invention includes a conductive layer composed of a conductive member, disposed on the portion of the other surface of the substrate that corresponds to the peripheral edge portion of the bias electrode.

Accordingly, in the radiation detector of the present invention, the charges generated in the insulating substrate by the electric field generated by applying the bias voltage to the bias electrode, are uniformly dispersed in the conductive layer. Since the radiation detector of the present invention can suppress changes in the electrostatic capacitance, a deterioration of the image quality of the radiation image can be suppressed.

Further, in the radiation detector of the present invention, since the conductive layer is disposed on the other surface of the substrate, the conductive layer can be disposed near to the collecting electrodes. Therefore, the radiation detector of the present invention can suppress an increase of the size of the radiation detector.

A second aspect of the invention, in the first aspect, the conductive layer may be disposed to cover, from the edge portion of the bias electrode, a region of the second surface of the substrate that corresponds to an edge portion of the semiconductor layer.

A third aspect of the invention, in the first aspect, the conductive layer may be disposed to cover the entire second surface of the substrate.

A fourth aspect of the invention, in the first aspect, the conductive layer may be connected to a potential maintaining section that maintains a voltage level of the conductive layer at a predetermined voltage level.

A fifth aspect of the invention, in the fourth aspect, the potential maintaining section may be arranged as a ground line connected to the ground, and the predetermined voltage level may be set to a ground level.

A sixth aspect of the invention, in the first aspect, the substrate and the conductive layer may have a light transmitting property.

A seventh aspect of the invention, in the first aspect, the conductive layer may be further disposed on a side surface of the substrate.

An eighth aspect of the invention, in the first aspect, the radiation detector may be used for mammography in which breast radiation imaging is carried out.

According to the above aspects, the present invention can suppress a deterioration of image quality of a radiation image while suppressing the increase in the size of the radiation detector.

BRIEF DESCRIPTION OF THE DRAWINGS

Exemplary embodiments of the invention will be described in detail based on the following figures, wherein:

FIGS. 1A and 1B are views showing a configuration of a radiation detector according to a first exemplary embodiment;

FIGS. 2A and 2B are schematic views showing a schematic configuration of an insulating substrate according to the first exemplary embodiment;

DETAILED DESCRIPTION OF THE INVENTION

Figure 3:
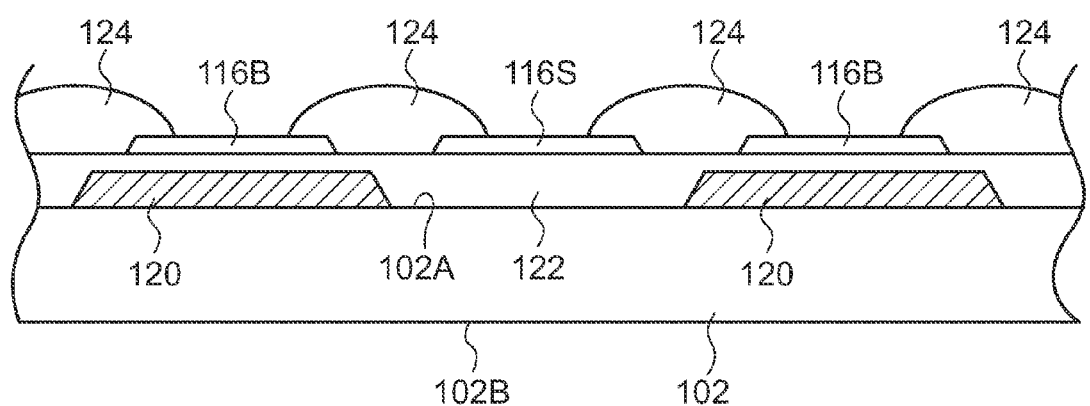
FIG. 3 is a sectional view showing a sectional structure in a detecting area of the insulating substrate according to the first exemplary embodiment.

Hereinafter, exemplary embodiments of a radiation detector according to the present invention will be explained by referring to the drawings. The radiation detector according to the exemplary embodiment is used in X-ray imaging apparatus, and the like. Further, the radiation detector according to the exemplary embodiment includes a photoconductive layer for exhibiting conductivity by receiving irradiation of the radiation. Furthermore, the radiation detector according to the exemplary embodiment records image information by receiving the irradiated radiation that carries the image information, and outputs an image signal that represents the recorded image information.

As the radiation detector, there is a so-called light reading type radiation detector 100 that reads charges by using a semiconductor material that generates charges due to illumination of light. Further, as the radiation detector, there are also a type of radiation detector 400 (hereinafter, called a thin film transistor (TFT) type) that stores charges generated due to irradiation of radiation, and that reads the stored charges by turning ON and OFF each row of electric switches such as thin film transistors (TFT), and the like.

First Exemplary Embodiment

First, a configuration where the present invention is applied to the light reading type radiation detector 100, will be explained as a first exemplary embodiment. FIG. 1A is a plan view showing an overall configuration of the light reading type radiation detector 100. Further, FIG. 1B is a sectional view of the radiation detector 100.

As shown in FIG. 1B, the radiation detector 100 includes, starting from the bottom, an insulating substrate 102, a radiation detecting layer 104, and a surface protecting layer 106. TCPs (Tape Carrier Packages) 108 for fetching a signal are connected to the outer peripheral portion of the radiation detector 100. By the TCPs 108, charges generated in a detecting area are read as signals, converted to voltages, and transferred to a read-out unit 110. The read-out unit 110 amplifies the transferred signals through an amplifier, converts the amplified signals by an A/D (analog/digital) conversion, and outputs the converted signals as image data.

Further, a high voltage application line 113 that supplies a bias voltage is connected to the radiation detector 100 as shown in an upper left portion of FIG. 1. A read line light source 112 and an erase surface light source 114 are disposed below the insulating substrate 102. The read line light source 112 carries out a mechanical scan. The erase surface light source 114 is disposed to erase remaining charges.

(Configuration of the Substrate)

Next, configuration of the insulating substrate 102 will be explained. FIG. 2A is a plan view showing a schematic configuration of the insulating substrate 102. Further, FIG. 2B is a sectional view of the insulating substrate 102. For simplification, in FIG. 2A, each of the TCPs 108 is disposed on the right and left sides, and each of the TCPs 108 has three channels, and therefore has six channels in total. In an ordinary example, the number of channels for each TCP 108 is 266 channels (five channels in each edge portions are common). Each of the channels has an electrode line and an electrode space of, for example, 45 μm and 25 μm. Lower electrodes 116 of the detecting area are alternately disposed on stripes, and common electrodes have a comb type structure.

FIG. 3 shows a sectional structure obtained by enlarging a lower electrode 116. The insulating substrate 102 acting as a supporting member is transparent to read light and erase light, and is a glass in a flat plate form having rigidity. Specifically, the insulating substrate 102 is formed by a soda lime glass. The thickness of the insulating substrate 102 is about 0.5 mm to 2.5 mm, and more preferably 1.8 mm.

Color filter layers 120 each having a predetermined width are formed on one surface 102A of the insulating substrate 102 with predetermined intervals. The color filter layers 120 cut light having the wavelength of the read light, whereas the color filter layers 120 are transparent to the wavelength of the erase light. When, for example, the wavelength of the read light is 470 nm and the wavelength of the erase light is 630 nm, a photosensitive resist, in which a red pigment is dispersed, is preferable as the color filter layers 120. Specifically, the resist is preferably a red resist used for, for example, an LCD color filter. The color filter layers 120 have, for example, a width of 25 μm, a pitch of 50 μm, and a thickness of 1.4 μm as the size thereof.

A transparent organic insulating layer 122 is formed to prevent irregularities of the color filter layers 120 formed by forming a pattern, and to make the color filter layers 120 flat. The organic insulating layer 122 is transparent to both the read light and the erase light. The organic insulating layer 122 is formed of, for example, PMMA, novolac resin, polyimide, and the like. The thickness of the organic insulating layer 122 is, for example, 2.0 μm and the organic insulating layer 122 is formed of a photosensitive resin, capable of forming the pattern. It is preferable that the color filter layers 120 and the organic insulating layer 122 are not formed to TCP connecting portions 133 to which an edge portion of the surface protecting layer 106 and the TCPs 108 are connected. This is to secure a bonding property of the surface protecting layer 106 and to make a repair of a TCP connecting step easy.

An electrode pattern of the lower electrodes 116 is formed on the organic insulating layer 122. Electrodes formed on the color filter layers 120 are called common B lines 116B, and electrodes formed in the portions where the color filter layers 120 are not disposed are called signal S lines 116S. The B lines 116B are made common outside of the radiation detecting unit. The width of the B lines 116B and the S lines 116S is, for example, 17 μm. The space and the pitch between the B lines 116B and the S lines 116S are 8 μm and 50 μm respectively. Further, the thickness of the B lines 116B and the S lines 116S is 0.2 μm. The lower electrodes 116 are also transparent to the read light and the erase light. Transparent electrodes using, for example, oxide of indium and tin (ITO: Indium-Tin-Oxide), oxide of indium and zinc (IZO: Indium-Zinc-Oxide), oxide of indium and germanium (IGO: Indium-Germanium-Oxide), and the like, are preferable as the lower electrodes 116. The lower electrode layer suppresses a breakage of the radiation detecting layer 104 by electric field concentration in minute projections on the surface of the lower electrode layer. Therefore, it is preferable that the surface of the lower electrode layer is flat and set to, for example, Ra<2 nm. Note that, Ra denotes an average center line roughness.

Further, an insulating layer (hereinafter, called an edge cover layer) 124 is disposed to the radiation detector 100 according to the exemplary embodiment, to protect edge portions of the lower electrodes 116. When an electric field is applied, the electric field concentration occurs at the edge portions of the electrodes, and higher electric field is generated compared to the center portions of the electrodes. The edge cover layer 124 is disposed to prevent the edge portions of the electrodes to have high electric field from coming into contact with the radiation detecting layer 104. It is preferable that the edge cover layer 124 has an insulation property, and is as transparent as possible to the read light and the erase light. The edge cover layer 124 is preferably formed of, for example, novolac resin, PMMA, and polyimide. The thickness of the edge cover layer 124 and the width (space width) of the edge cover layer 124 for covering the edge portions of the electrodes are, for example, about 0.8 μm and 4 μm respectively. The space width between lower electrode layers preferably has the same space width not only in the detecting area but also in a reading portion to which the electric field is applied. This is because, when the space width becomes partially widened, the electric field concentration becomes strong and deterioration begins therefrom.

(Configuration of Layers)

Figure 4:
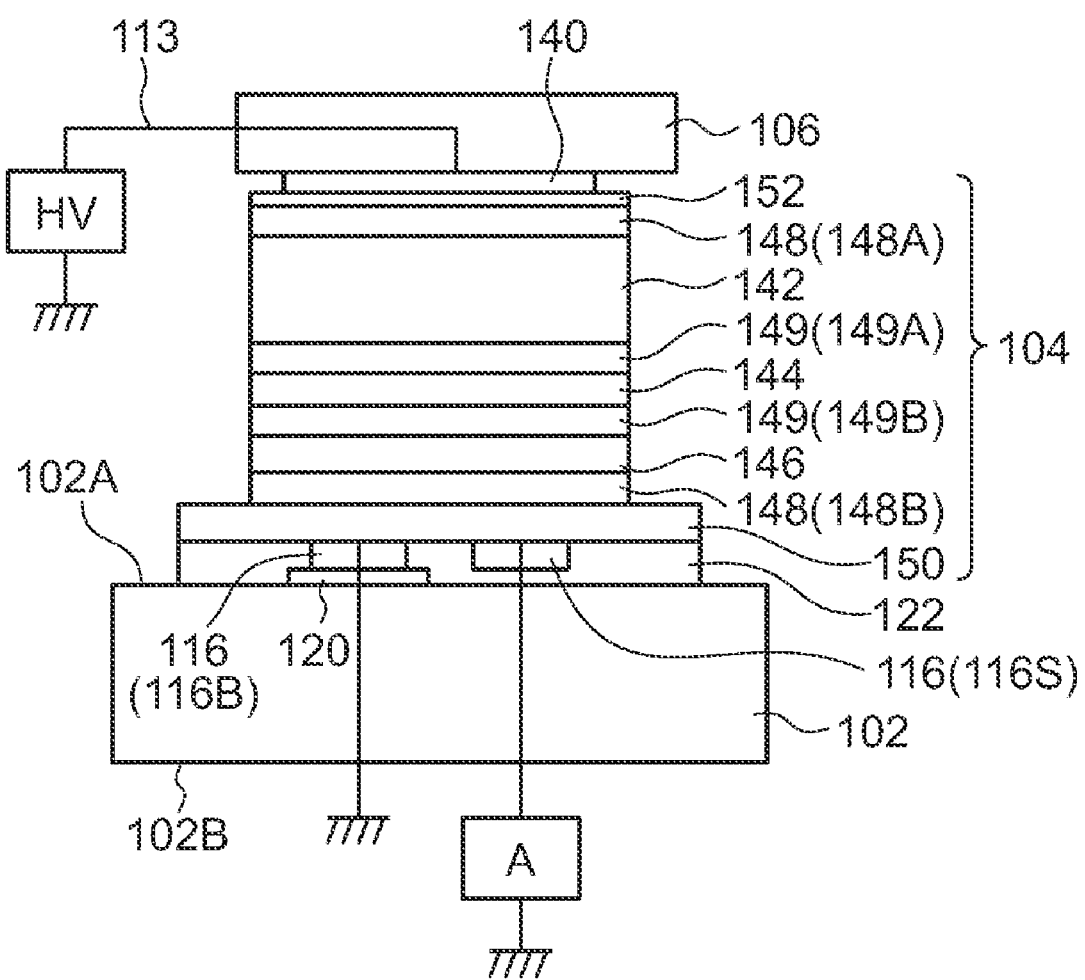
FIG. 4 is a schematic sectional view schematically showing a layer configuration of the radiation detector according to the first exemplary embodiment.

Next, a configuration of layers of the light reading type radiation detector 100 will be explained in detail. FIG. 4 is a view schematically showing the layer configuration of the radiation detector 100.

The color filter layers 120, the organic insulating layer 122, the lower electrodes 116, the radiation detecting layer 104, and the bias electrode 140 are sequentially layered on the one surface 102A of the insulating substrate 102.

The high voltage application line 113 is connected to the bias electrode 140. When charges that are the detection target are negative charges (electrons), negative bias voltage is supplied to the bias electrode 140 from a high voltage power supply (HV). Whereas, when the charges that are the detection target are positive charges (holes), a positive bias voltage is supplied to the bias electrode 140 from the high voltage power supply. The bias electrode 140 applies the bias voltage supplied from the high voltage application line 113 to the radiation detecting layer 104. The bias electrode 140 may be formed of metals such as Au, Ni, Cr, Pt, Ti, Al, Cu, Pd, Ag, Mg, an alloy containing 3% to 20% of MgAg, a Mg—Ag intermetallic compound, an alloy containing 3% to 20% of MgCu, and a Mg—Cu intermetallic compound. In particular, Au, Pt, and Mg—Ag intermetallic compound are preferably used as the bias electrode 140. When, for example, Au is used, the thickness of the bias electrode 140 is preferably from 15 nm to 200 nm, and more preferably from 30 nm to 100 nm.

When, for example, the alloy containing 3% to 20% of MgAg is used, the thickness of the bias electrode 140 is preferably from 100 nm to 400 nm.

The bias electrode 140 may be created by any optional method, however, preferably, they are formed by a vapor deposition by a resistance heating method. When, for example, the bias electrode 140 is formed by the vapor deposition, a shutter is opened after a metal block in a boat is dissolved using the resistance heating method, and the metal block is vapor deposited for 15 seconds, and then cooled once. The operation is repeated plural times until the resistance value of a metal thin film is sufficiently lowered.

As shown in FIG. 4, the radiation detecting layer 104 includes a recording photoconductive layer 142, a charge storage layer 144, a reading photoconductive layer 146, an electrode interface layer 148, a charge storage layer interface layer 149, a lower charge selecting/transparent layer 150, and an upper charge selecting/transparent layer 152.

The recording photoconductive layer 142 is composed of a photoconductive substance that generates positive and negative charges (electron-hole pairs) by absorbing electromagnetic waves (here, X-rays). The recording photoconductive layer 142 is composed of a compound mainly consisting of at least one of amorphous Se (a-Se), $Bi_{12}MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K), PbO, $HgI_2$, $PbI_2$, CdS, CdSe, CdTe, $BiI_3$, GaAs, and the like.

When the recording photoconductive layer 142 is composed of a photoconductive substance mainly consisting of, for example, the amorphous Se, and the thickness of the recording photoconductive layer 142 is preferably from 100 µm to 2000 µm. Further, when the recording photoconductive layer 142 is used particularly for mammography, the thickness of the recording photoconductive layer 142 is preferably within the range from 100 µm to 250 µm, and when the recording photoconductive layer 142 is used for ordinary imaging, the thickness of the recording photoconductive layer 142 is preferably within the range from 500 µm to 1200 µm.

The charge storage layer 144 is composed of a substance having an insulating property to charges having a polarity as the detection target. The charge storage layer 144 is composed of chalcogenide compounds, such as $As_2S_3$, $Sb_2S_3$, ZnS, $As_2Se_3$, and $Sb_2Se_3$, acrylic organic resin, organic polymers such as polyimide, BCB, PVA, acryl, polystyrene, polycarbonate, and polyetherimide, and other oxides and fluorides. Further, it is more preferable that the charge storage layer 144 has an insulating property to the charges having a polarity as the detection target, and has a conductive property to charges having a polarity opposite to the above polarity. It is preferable that, in the charge storage layer 144, number of times the product is moved, multiplied by, the life of the product is 3-digit or more than the polarities of the charges.

The reading photoconductive layer 146 is composed of a photoconductive substance that generates charges by absorbing the electromagnetic waves, in particular, visible light. The reading photoconductive layer 146 is composed of a semiconductor substance which is a compound mainly consisting of at least one of amorphous Se, amorphous Si, crystal Si, ZnO, ZnS, ZnSe, ZnTe, PbO, CdS, CdSe, CdTe, GaAs, and the like and whose energy gap is included in the range of 0.7 eV to 2.5 eV.

The reading photoconductive layer 146 may have any thickness as long as the read light can be sufficiently absorbed through the thickness. Together therewith, the reading photoconductive layer 146 may have any thickness as long as the electric field due to the charges stored in the charge storage layer can drift the optically energized charges. The preferable thickness of the reading photoconductive layer 146 is about 1 µm to 30 µm.

The electrode interface layer 148 includes an upper electrode interface layer 148A interposed between the recording photoconductive layer 142 and the bias electrode 140, and a lower electrode interface layer 148B interposed between the reading photoconductive layer 146 and the lower electrodes 116.

For the purpose of preventing crystallization, amorphous Se to which As is doped in the range of 1% to 20%, amorphous Se to which S, Te, P, Sb, Ge are doped in the range of 1% to 10%, amorphous Se to which the above elements and other elements are doped in combination, or $As_2S_3$, $As_2Se_3$, and the like, which have a higher crystallization temperature are preferably used for the electrode interface layer 148. Further, for the purpose of preventing injection of electric charges from the electrode layers, in particular, for the purpose of preventing injection of holes, it is also preferable to dope alkali metals of Li, Na, K, Rb, Cs, and the like, or molecules of LiF, NaF, KF, RbF, CsF, LiCl, NaCl, KCl, RbF, CsF, CsCl, CsBr and the like, to the electrode interface layer 148 in the range of 10 ppm to 5000 ppm in addition to the above dope elements. On the contrary, it is also preferable to dope halogen elements of Cl, I, Br, and the like, or molecules of $In_2O_3$ and the like, in the range of 10 ppm to 5000 ppm, to the electrode interface layer 148, to prevent injection of electrons.

The thickness of the electrode layer 148 is preferably about 0.05 µm to 1 µm to that sufficiently achieves the above objects.

The charge storage layer interface layer 149 includes a charge storage layer upper interface layer 149A interposed between the charge storage layer 144 and the recording photoconductive layers 142, and a charge storage layer lower interface layer 149B interposed between the charge storage layer 144 and the reading photoconductive layer 146.

To suppress crystallization of a hole/electron recoupling portion, the charge storage layer interface layer 149 is preferably doped with amorphous Se containing As in the range of 0.1% to 40%. Further, the charge storage layer interface layer 149 may also be preferably doped with alkali metals of Li, Na, K, Rb, Cs, and the like, or halogen elements of Cl, I, Br, and the like, in addition to the above dope elements. Further, the thickness of the interface layer is preferably set between 0.5 µm and 50 µm to sufficiently achieve the above objects.

The lower electrode interface layer 148B, the reading photoconductive layer 146, the charge storage layer lower interface layer 149B, the charge storage layer 144, the charge storage layer upper interface layer 149A, the recording photoconductive layer 142, and the upper electrode interface layer 148A may be formed by any arbitrary method. As the forming method, for example, a substrate may be held in a vacuum vessel having a degree of vacuum from $10^{-3}$ to $10^{-7}$ Torr at from 25° C. to 70° C., the temperature of a boat or a pot, in which the respective alloys are placed, can be increased by resistance heating, a lamp, an electron beam, and the like, and alloys or compounds can be layered on the substrate by evaporation or sublimation.

Further, when the respective layers are organic polymer layers, the respective layers may be formed by being coated using a solvent.

The lower charge selecting/transparent layer 150 may be interposed between the recording photoconductive layer 142 and the lower electrode 116. When the electrode interface layer 148 exists, the lower charge selecting/trans parent layer 150 is preferably interposed between the electrode interface layer 148 and the lower electrodes 116. The lower charge selecting/transparent layer 150 has rectification characteristics for reducing a dark current and a leak current. The lower charge selecting/transparent layer 150 is configured by a layer that prevents injection of electrons (electron injection preventing layer) although the layer is a conductive material to holes, when the positive voltage is applied to the bias electrode 140. On the other hand, the lower charge selecting/transparent layer 150 is configured by a layer that prevents injection of holes (hole injection preventing layer) although the layer is a conductive material to electrons, when the negative voltage is applied to the bias electrode 140. The lower charge selecting/transparent layer 150 preferably has a resistivity of $10^8$ Ωcm or more. Further, the lower charge selecting/transparent layer 150 preferably has a film thickness of 0.01 µm to 10 µm.

Inorganic materials consisting of compositions of $Sb_2S_3$, SbTe, ZnTe, CdTe, SbS, AsSe, AsS and the like or organic polymers, may be used as the electron injection preventing layer. The material of the layers composed of the inorganic material are used by adjusting a carrier selection property, by changing the composition of the material from the stoichiometric composition, or by arranging the composition as a multiple composition of two or more kinds of homologous elements. A polymer hole transport material containing a pendant portion having a charge transport group such as PVK, may be used for the layers composed of the organic polymer. Further, insulating polymers of polycarbonate, polystyrene, polyimide, poly cycloolefin and the like, mixed with a low molecule hole transport material, may also be used for the material of the layer composed of the organic polymers.

Inorganic materials of CdS, $CeO_2$, $Ta_2O_5$, SiO, and the like, or organic polymers are preferable as the material of the hole injection preventing layer. Further, insulating polymers of polycarbonate, polystyrene, polyimide, poly cycloolefin and the like, mixed with a low molecule electron transport material, may be used for the material of the layer composed of the organic polymers. Trinitrofluoren and its derivative, diphenoquinone derivatives, binaphytyl quinone detivatives, oxazole derivatives, triazole derivatives, a mixture of carbon clusters of $C_{60}$ (fullerene), $C_{70}$, and the like, are preferable as the electron transport material.

Meanwhile, a thin insulating polymer layer may be preferably used as the hole injection preventing layer, and, for example, acrylic resins of parylene, polycarbonate, PVA, PVP, PVB, a polyester resin, polymethyl methacrylate, and the like, are preferable. In this case, the insulating polymer layer preferably has a film thickness of 2 µm or less, and more preferably a film thickness of 0.5 µm or less.

Note that, $Sb_2S_3$ has a strong property having many localized levels for capturing electrons so that it has an electron injection preventing property. However, since an interface between a $Sb_2S_3$ layer and an a-Se layer adjacent to the $Sb_2S_3$ layer acts as an electric barrier, the interface is used as a hole injection preventing layer.

When the lower charge selecting/transparent layer 150 is disposed by using an inorganic material, the lower charge selecting/transparent layer 150 may be formed by any arbitrary method. As the forming method, vacuum vapor deposition, sputtering, plasma CVD, electron-beam vapor deposition, and the like, for example, can be preferably used.

When the lower charge selecting/transparent layer 150 is disposed by using an organic material, the lower charge selecting/transparent layer may be formed by any arbitrary method. As the forming method, a material is dissolved by an organic solvent and coated by a known method. Although a dip method, a spray method, an inkjet method, and the like, for example, are exemplified as the creating method of the lower charge selecting/transparent layer 150, the inkjet method, which may easily control a ground region, is preferably used.

An upper charge selecting/transparent layer 152 may be interposed between the recording photoconductive layer 142 and the bias electrode 140. When the electrode interface layer 148 exists, the upper charge selecting/transparent layer 152 is interposed between the electrode interface layer 148 and the bias electrode 140. The upper charge selecting/transparent layer 152 preferably has rectification characteristics for reducing a dark current and a leak current. The upper charge selecting/transparent layer 152 is configured by a layer that prevents injection of holes (hole injection preventing layer) although the layer is a conductive material to electrons, when the positive voltage is applied to the bias electrode 140. On the other hand, the upper charge selecting/transparent layer 152 is configured by a layer that prevents injection of electrons (electron injection preventing layer) although the layer is a conductive material to holes, when the negative voltage is applied to the bias electrode 140. Preferred Resistivity of the upper charge selecting/transparent layer 152 is $10^8$ Ωcm or more. Further, preferred film thickness of the upper charge selecting/transparent layer 152 is 0.01 µm to 10 µm.

Inorganic materials consisting of compositions of $Sb_2S_3$, SbTe, ZnTe, CdTe, SbS, AsSe, AsS and the like, or organic polymers may be used as a material of the electron injection preventing layer. When the inorganic material is used as the material of the electron injection preventing layer, the material may be preferably used by adjusting a carrier selection property by changing the composition of the material from the stoichiometric composition, or by arranging the composition as a multiple composition of two or more kinds of homologous elements. When an organic polymer is used as the material of the electron injection preventing layer, a polymer hole transport material containing a pendant portion having a charge transport group such as PVK, may be used. Further, insulating polymers of polycarbonate, polystyrene, polyimide, poly cycloolefin and the like, which are mixed with 5% to 80% of a low molecule hole transport material in a weight ratio, may be used. Oxazole derivatives, triphenyl methane derivatives, hydrazone derivatives, triphenyl amine derivatives, and the like, are used as the hole transport material. Specifically, the hole transport material is NPD, TPD, PDA, m-MTDATA2-TNATA, and TPAC.

Inorganic materials of CdS, $CeO_2$, $Ta_2O_5$, SiO, and the like, or organic polymers are preferable as the material of the hole injection preventing layer. When the inorganic material is used as the material of the hole injection preventing layer, the material may be preferably used by adjusting a carrier selection property by changing the composition of the material from the stoichiometric composition or by arranging the composition as a multiple composition of two or more kinds of homologous elements. When an organic polymer is used as the material of the hole injection preventing layer, an insulating polymer of polycarbonate, polystyrene, polyimide, poly cycloolefin, and the like, which is mixed with 5% to 80% of a low molecule electron transport material in a weight ratio, may be used. Trinitrofluoren and its derivatives, diphenoquinone derivatives, binaphytyl quinone detivatives, oxazole derivatives, triazole derivatives, a mixture of carbon clusters of $C_{60}$ (fullerene), $C_{70}$, and the like are preferable as the electron transport material. Specifically, the electron transport material is TNF, DMDB, PBD, and TAZ.

On the other hand, a thin insulating polymer layer may also be used as the hole injection preventing layer. As the material of the insulating polymer layer, acrylic resins of, for example, parylene, polycarbonate, PVA, PVP, PVB, polyester resin, polymethyl methacrylate, and the like, are preferable. In this case, the preferable film thickness of the insulating polymer layer is 2 μm or less, and more preferably 0.5 μm or less.

Note that, $Sb_2S_3$ has a strong property having many localized levels for capturing electrons so that it has an electron injection preventing property. However, since an interface between a $Sb_2S_3$ layer and an a-Se layer adjacent to the $Sb_2S_3$ layer acts as an electric barrier, the interface is used as the hole injection preventing layer.

When the upper charge selecting/transparent layer 152 is disposed by using an inorganic material, the upper charge selecting/transparent layer 152 may be formed by any arbitrary method. For example, vacuum vapor deposition, sputtering, plasma CVD, electron-beam vapor deposition, and the like are used as the forming method of the upper charge selecting/transparent layer 152.

When the upper charge selecting/transparent layer 152 is disposed by using an inorganic material, the upper charge selecting/transparent layer 152 may be formed by any arbitrary method. As the forming method of the upper charge selecting/transparent layer 152, a material is dissolved by an organic solvent and coated by a known method. Although a dip method, a spray method, an inkjet method, and the like, for example, are exemplified as the creating method of the upper charge selecting/transparent layer 152, the inkjet method, which may easily control a disposing region, is preferably used.

A polyparaxylylene film for improving the durability of the photoconductive layer, and a surface protecting layer 106 composed of a protection film for securing an insulating property from a high bias voltage, are layered on the surface of the radiation detector 100 on which the respective layers are formed, as described above.

A voltage applied to the device is used in the range of 2 kV to 10 kV, according to the thickness of the photoconductive layer. To secure the insulating property with a margin even in a high humidity environment and the like, the preferable dielectric breakdown strength of the protection film is 10 kV or more.

Figure 5:
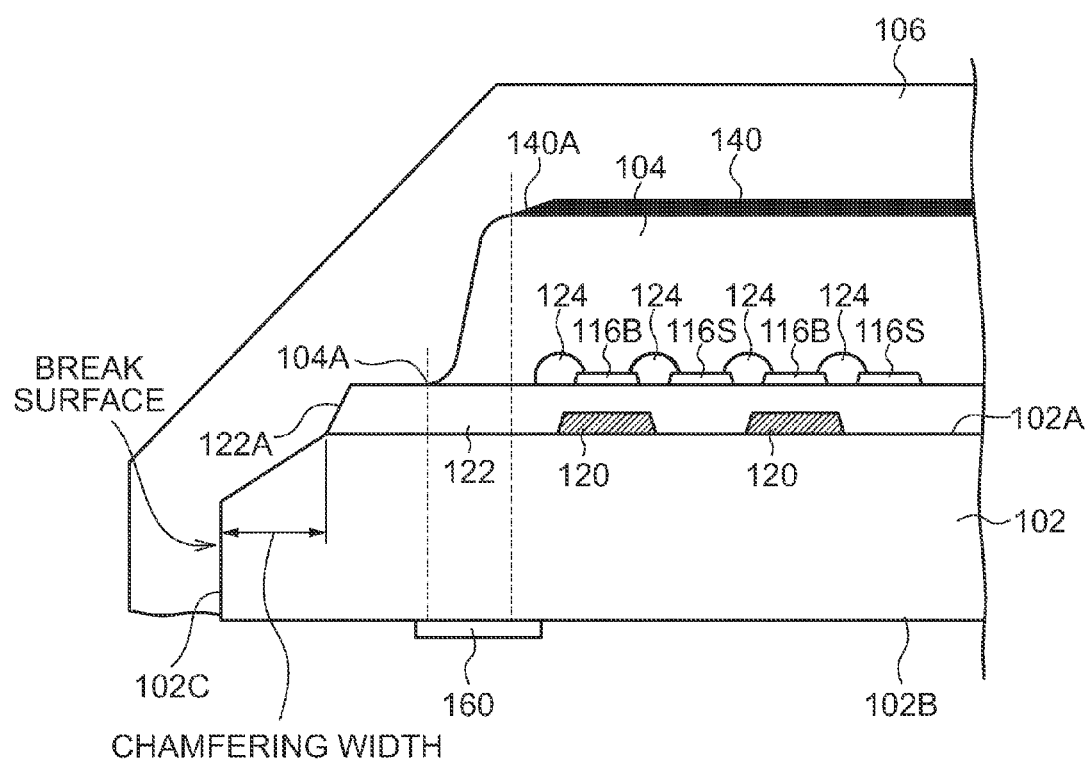
FIG. 5 is a sectional view showing a configuration of an edge portion of the insulating substrate according to the first exemplary embodiment.

FIG. 5 shows a sectional view of an edge portion A of the radiation detector 100 (X-X line of FIG. 1). Preferably, an edge portion 104A of the radiation detecting layer 104 is located inward of an edge portion 122A of the organic insulating layer 122. This is because if the edge portion 104A of the radiation detecting layer 104 is disposed outward of the edge portion 122A of the organic insulating layer 122, a step of the edge portion 122A of the organic insulating layer 122 causes a crack of the radiation detecting layer 104.

Further, when the radiation detector 100 of the invention is used for mammography, the detecting area must extend to reach the edge portion A of the insulating substrate 102. The distance from the edge portion of the insulating substrate 102 to the edge portion of the detecting area is, for example, 2.4 mm. With this configuration, an area, in which a spacer for connecting an edge portion of the surface protecting layer 106 is disposed, may not be obtained in the edge portion A. Accordingly, when the radiation detector 100 of the invention is used for mammography, the edge portion of the surface protecting layer 106 is connected to a side surface 102C of the insulating substrate 102. Due thereto, it is preferable to make the chamfering width of the edge portion of a glass as small as possible (for example, 0.25 mm or less) and is preferable not to chamfer the portion of a break surface other than a corner portion.

Further, a conductive layer 160 composed of a conductive member is disposed on the radiation detector 100 in the back side of peripheral edge portion 104A of the bias electrode 140 of the other surface 102B of the insulating substrate 102. In the exemplary embodiment, the conductive layer 160 is disposed to cover from the back side of an edge portion 140A of the bias electrode 140 to a region corresponding to the back side of the edge portion 104A of the radiation detecting layer 104.

The conductive layer 160 is formed by bonding the conductive member such as a conductive metal by a tape and an adhesive. Note that, the conductive layer 160 may be formed evaporating a metal such as an alloy and an intermetallic compound, likewise the lower electrodes 116 and the bias electrode 140. The conductive layer 160 is connected to a ground line 162 (refer to FIG. 6) connected to the ground. With this configuration, the conductive layer 160 has a voltage set to a ground level.

When the radiation detector 100 is used for mammography, it is desired to carry out imaging detection in a low radiation amount to suppress exposure by X-rays imaging. To detect changes of a shade with low radiation irradiation amount, it is preferable to set the X-rays transmittance rate of the members, except the imaging subject (breast), within the path of the radiation from a radiation source to the radiation detector 100, to 98% or higher. Accordingly, the radiation detector 100 of the exemplary embodiment may obtain a clearer image.

On the other hand, the radiation detector 100 has such a structure that spacer members are bonded to the three sides excluding the edge portion A of the radiation detector 100, and the surface protecting layer 106 is bonded by cutting the surface protecting layer 106 on the upper surfaces of the spacer members. To cut the surface protecting layer 106 on the upper surfaces of the spacer members, a material of the spacer members must have a certain degree of hardness. A glass, a PET film, and the like may be applied as the material of the spacer members. Further, an acrylic adhesive material, a two-component epoxy adhesive, a UV curing type adhesive, and the like, are applicable to bond these spacer members.

(Operation of Light Reading Type Radiation Detector)

Next, an operation of the light reading type radiation detector 100 will be explained.

When an X-rays imaging apparatus using the radiation detector 100 images a radiation image, the X-rays imaging apparatus supplies a predetermined bias voltage according to the polarity of charges of the detection target, and applies the bias voltage to the radiation detecting layer 104 from the bias electrode 140. By applying the bias voltage, in the radiation detecting layer 104, electric field that moves the charges having polarity of the detection target within the charges generated in the radiation detecting layer 104, to the lower electrodes 116 side, is generated. The X-rays imaging apparatus carries out exposure when the bias voltage is applied to the radiation detecting layer 104 from the bias electrode 140. For example, in mammography for carrying out breast radiation imaging, exposure is carried out by causing the breast to come into contact with the radiation detector 100 from the edge portion A side thereof. The X-rays, which have passed through an imaging target portion of a person being image, are irradiated to the radiation detector 100. Accordingly, charges (electron-hole pairs) are generated in the recording photoconductive layer 142 of the radiation detecting layer 104, and the charges having the polarity of the detection target within the generated charges are stored in the charge storage layer 144.

After the completion of the exposure, the X-rays imaging apparatus stops the supply of the bias voltage from the high voltage application line 113, and illuminates the read light by causing the read line light source 112 to scan a lower portion of the insulating substrate 102 when the bias electrode 140 and the lower electrode B lines 116B are grounded (short-circuited). Accordingly, charges are generated in the reading photoconductive layer 146 of the radiation detecting layer 104 to which the read light is irradiated, and an electric field is optically energized. Next, the charges stored in the charge storage layer 144 flows out to the respective S lines 116S of the lower electrodes, as charge signals. The charge signals that flowed out to the respective S lines 116S are converted to voltages by the TCPs 108, and are transferred to the read-out unit 110. The read-out unit 110 amplifies the transferred signals by an amplifier, converts the amplified signals by an A/D (analog/digital) conversion, and outputs image data.

In the radiation detector 100, when imaging the radiation image and when the bias voltage is applied from the bias electrode 140, charges are also generated in the insulating substrate 102 by the electric field generated by the application of the bias voltage.

Figure 6:
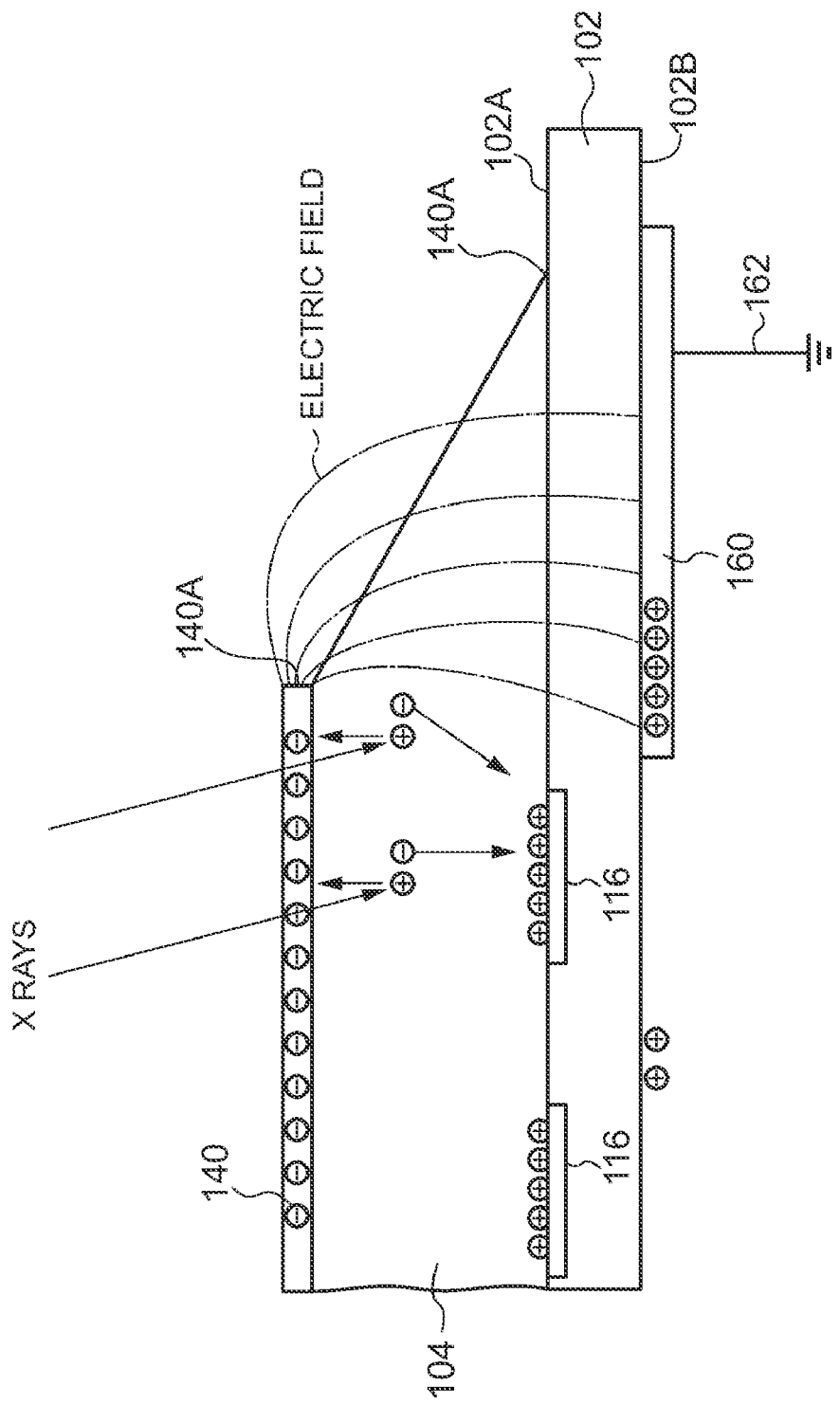
FIG. 6 is a schematic view showing how charges are generated in the insulating substrate according to an exemplary embodiment.

FIG. 6 schematically shows how the charges are generated in the insulating substrate 102. When, for example, the negative bias voltage is applied from the bias electrode 140, positive charges are generated in the insulating substrate 102 by the electric field generated by applying the bias voltage. In particular, the edge portion 140A of the bias electrode 140 has a smaller number of confronting lower electrodes 116, and has a larger charge amount since a wrap-around of the electric field occurs.

However, in the radiation detector 100 according to the exemplary embodiment, the conductive layer 160 is disposed to the other surface 102B of the insulating substrate 102. Therefore, the charges generated in the insulating substrate 102 flows out through the ground line 162, and the potential of the conductive layer 160 is kept to the ground level. As a result, the change of an electrostatic capacitance generated between the insulating substrate 102 and the lower electrodes 116 is suppressed. Therefore, the radiation detector 100 according to the exemplary embodiment can suppress a deterioration of the image quality of the radiation image.

Further, in the radiation detector 100 according to the exemplary embodiment, the conductive layer 160 is disposed on the other surface 102B of the insulating substrate 102. Therefore, in the radiation detector 100 according to the exemplary embodiment, even if the conductive layer 160 is disposed at a position near to the lower electrodes 116, a discharge between the conductive layer 160 and the lower electrodes 116 can be prevented. As a result, the exemplary embodiment may reduce the size of the radiation detector 100. In particular, when the radiation detector 100 according to the exemplary embodiment is used for mammography, the distance between the edge portion A of the radiation detector 100 and the detecting area can be narrowed. Therefore, the radiation detector 100 according to the exemplary embodiment can image the breast up to a region near to the chest.

Second Exemplary Embodiment

Figure 7:
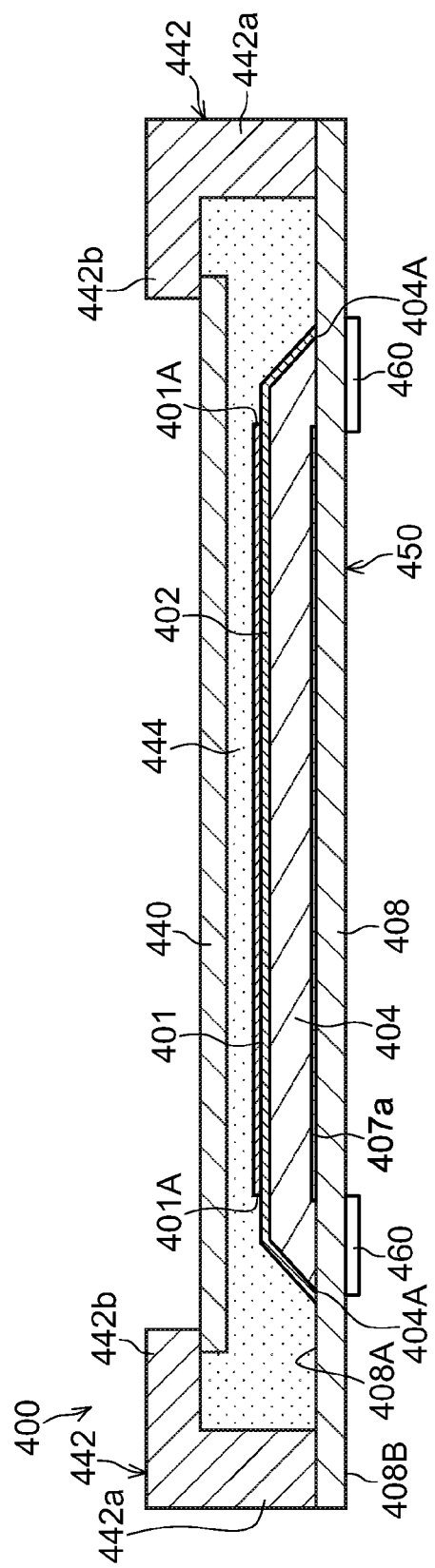
FIG. 7 is a schematic sectional view showing an overall configuration of a radiation detector according to a second exemplary embodiment.
Figure 8:
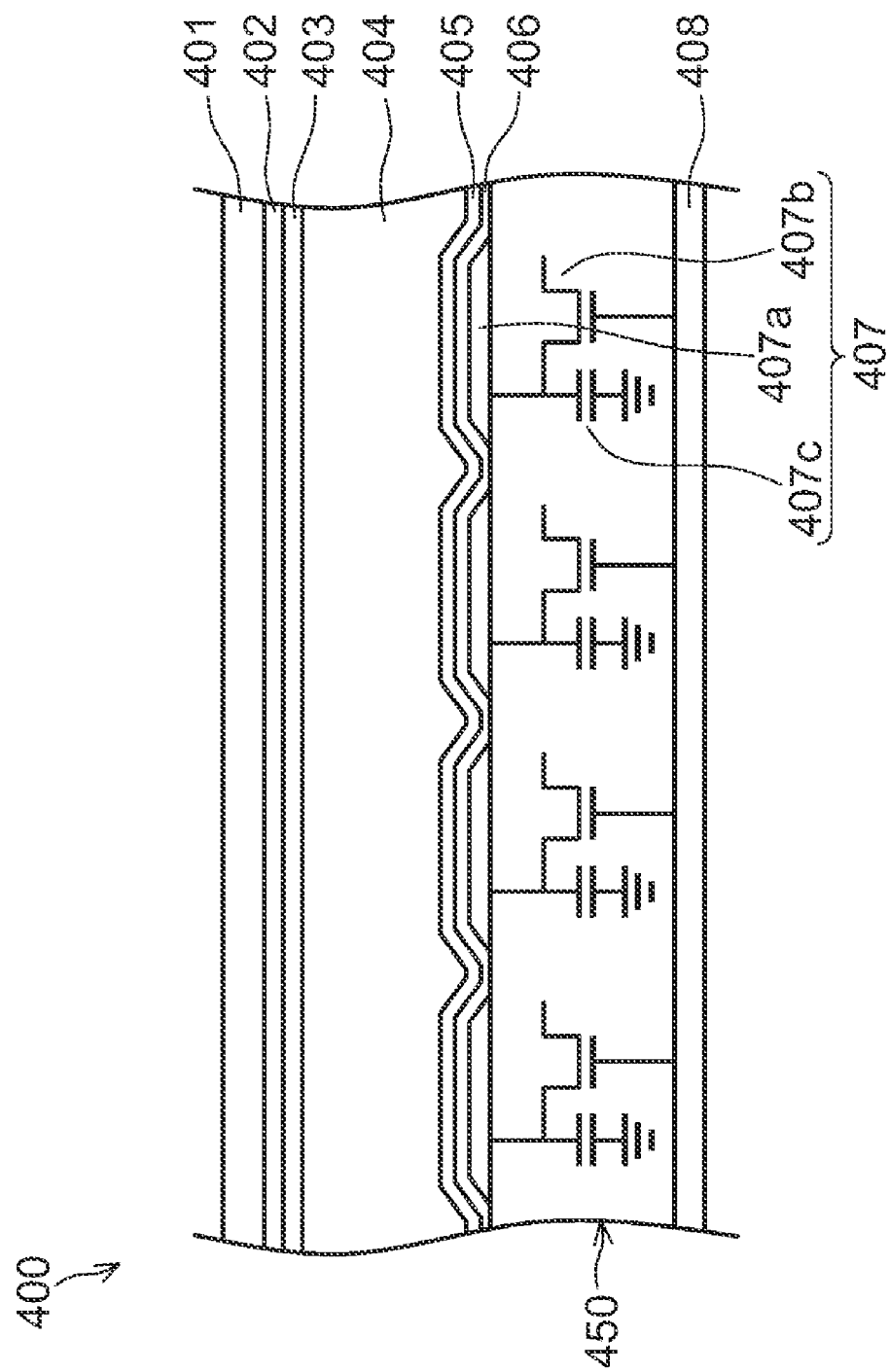
FIG. 8 is a view showing a configuration of a main portion of the radiation detector according to the second exemplary embodiment.

Next, a configuration, to which the invention is applied to a TFT type radiation detector 400, will be explained as a second exemplary embodiment. FIG. 7 is a schematic sectional view showing an overall configuration of the TFT type radiation detector 400. FIG. 8 is a view showing a configuration of a main portion of the TFT type radiation detector 400. Further, FIG. 8 is the view showing an insulating substrate 408 and respective portions layered on the insulating substrate 408.

As shown in FIGS. 7 and 8, the TFT type radiation detector 400 according to the exemplary embodiment includes a photoconductive layer 404. When X-rays are irradiated on one surface 408A of the insulating substrate 408, the photoconductive layer 404 generates the charges. As a material of the photoconductive layer 404, an amorphous material, which has a high dark resistance, exhibits a photoconductivity when X-rays are irradiated, and can be formed in a film having a large area by vacuum vapor deposition at a low temperature, is preferred.

An amorphous Se (a-Se) film, for example, is used as the amorphous material. Further, a material obtained by doping As, Sb, and Ge to amorphous Se is suitable for the photoconductive layer 404, because of the thermal stability.

A bias electrode 401 is formed on the photoconductive layer 404. Radiations, which carry image information, pass through the bias electrode 401, and the bias electrode 401 applies a bias voltage to the photoconductive layer 404. The bias electrode 401 is formed of, for example, gold (Au) or platinum (Pt). The radiations that has passed through the bias electrode 401 are irradiated on the photoconductive layer 404.

Plural charge collecting electrodes 407a that collects electrodes generated by the photoconductive layer 404 are formed on the side of the photoconductive layer 404 opposite to the side thereof where the bias electrode 401 is disposed, namely, under the photoconductive layer 404. As shown in FIG. 8, the charge collecting electrodes 407a are connected to charge storage capacitors 407c and switching devices 407b, respectively. The charge collecting electrodes 407a are disposed on the insulating substrate 408.

Further, active matrix layers 407 are configured by the charge collecting electrodes 407a, the switching devices 407b, and the charge storage capacitors 407c. An active matrix substrate 450 is configured by an insulating substrate 408 and the active matrix layers 407.

As shown in FIG. 7, an organic polymer film 402 is interposed between the photoconductive layer 404 and the bias electrode 401, to suppress crystallization of the photoconductive layer 404.

The organic polymer film 402 is formed by using a coating method such as an inkjet method. Further, the organic polymer film 402 may act as a charge selecting/transparent layer having a charge selecting/transparent property. The charge selecting/transparent property is a property that causes the charges having a polarity opposite to the bias electrode 401 to pass, as well as for preventing the charges having the same polarity as the bias electrode 401 to pass.

Note that, as shown in FIG. 8, a lower portion charge selecting/transparent layer 406, that has a polarity opposite to the organic polymer film 402, is preferably interposed between the photoconductive layer 404 and the charge collecting electrodes 407a.

When the organic polymer film 402 acts as the charge selecting/transparent layer and when a positive voltage is applied to the bias electrode 401, the organic polymer film 402 is configured by a layer (hole injection preventing layer) that prevents injection of holes although it is a conductive material to electrons. Meanwhile, when a negative voltage is applied to the bias electrode 401, the organic polymer film 402 is configured by a layer (electron injection preventing layer) that prevents injection of electrons although it is a conductive material to holes.

Note that when the organic polymer film 402 is used as the hole injection preventing layer, the electron injection preventing layer is used for the lower portion charge selecting/transparent layer 406. On the other hand, when the organic polymer film 402 is used as the electron injection preventing layer, the hole injection preventing layer is used for the lower portion charge selecting/transparent layer 406.

A film, which is formed by mixing a hole block material with insulating polymers of polycarbonate, polystyrene, polyimide, poly cycloolefin, and the like, may be used as the hole injection preventing layer.

Preferably, at least one kind of the hole block materials contained in the hole injection preventing layer should be at lease one kind selected among a carbon cluster or its derivatives. Further, the preferable carbon cluster should be selected among fullerene $C_{60}$, fullerene $C_{70}$, oxidized fullerene, or their derivatives.

Note that, the organic polymer film 402 is not indispensable. A charge selecting/transparent layer composed of an inorganic material may be disposed in place of the organic polymer film 402. Further, an inorganic material may be used for the lower portion charge selecting/transparent layer 406.

Inorganic materials consisting of compositions of $Sb_2S_3$, SbTe, ZnTe, CdTe, SbS, AsSe, AsS and the like, may be used as a material constituting the electron injection blocking layer, composed of the inorganic material. The layers composed of the inorganic material may be used by adjusting a carrier selection property by changing the composition of the material from the stoichiometric composition, or by arranging the composition as a multiple composition of two or more kinds of homologous elements.

Inorganic materials of CdS, $CeO_2$, $Ta_2O_5$, SiO, and the like, can be used as a material of the hole injection blocking layer, composed of an inorganic material. The layers composed of the inorganic material may be used by adjusting a carrier selection property by changing the composition of the material from the stoichiometric composition, or by arranging the composition as a multiple composition of two or more kinds of homologous elements.

Note that, $Sb_2S_3$ has a strong property having many localized levels for capturing electrons so that it has an electron injection blocking property. However, since an interface between a $Sb_2S_3$ layer and an a-Se layer adjacent to the $Sb_2S_3$ layer acts as an electric barrier, the interface is used as the hole injection blocking layer.

As shown in FIG. 8, crystallization suppressing layers 403, 405 may be interposed between the organic polymer film 402 and the photoconductive layer 404, and between the lower portion charge selecting/transparent layer 406 and the photoconductive layer 404, respectively. GeSe, $GeSe_2$, $Sb_2Se_3$, a-$As_2Se_3$, Se-As, Se-Ge, a Se-Sb compound, and the like may be used as a material of the crystallization suppressing layers 403, 405.

Further, a conductive layer 460, composed of a conductive member, is disposed on the radiation detector 400 in the back side of peripheral edge portion 401A of the bias electrode 401 of the other surface 408B of the insulating substrate 408. In the exemplary embodiment, the conductive layer 460 is disposed to cover from the back side of the edge portion 401A of the bias electrode 401 to a region that corresponds to the back side of an edge portion 404A of the photoconductive layer 404.

The conductive layer 460 may be formed by bonding a conductive member such as a conductive metal by a tape and an adhesive, likewise to the first exemplary embodiment. Further, the conductive layer 460 may be formed by vapor depositing a metal such as an alloy and an intermetallic compound, likewise to the bias electrode 401. The conductive layer 460 is connected to a ground line which is connected to the ground (not shown). With this configuration, the conductive layer 460 has a voltage set to a ground level.

Figure 9:
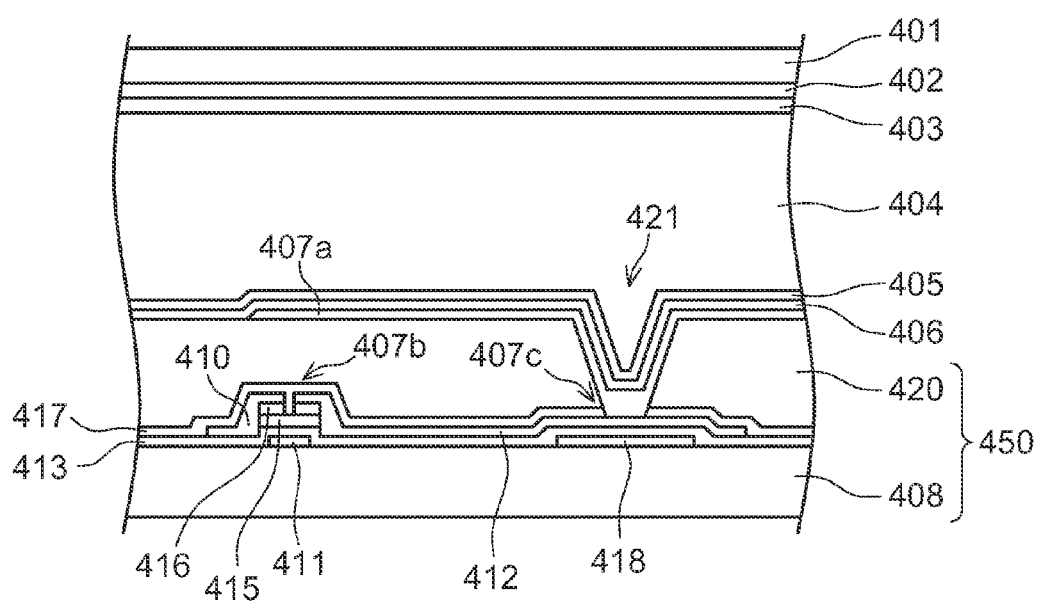
FIG. 9 is a sectional view showing a structure of the radiation detector according to the second exemplary embodiment in one pixel unit.
Figure 10:
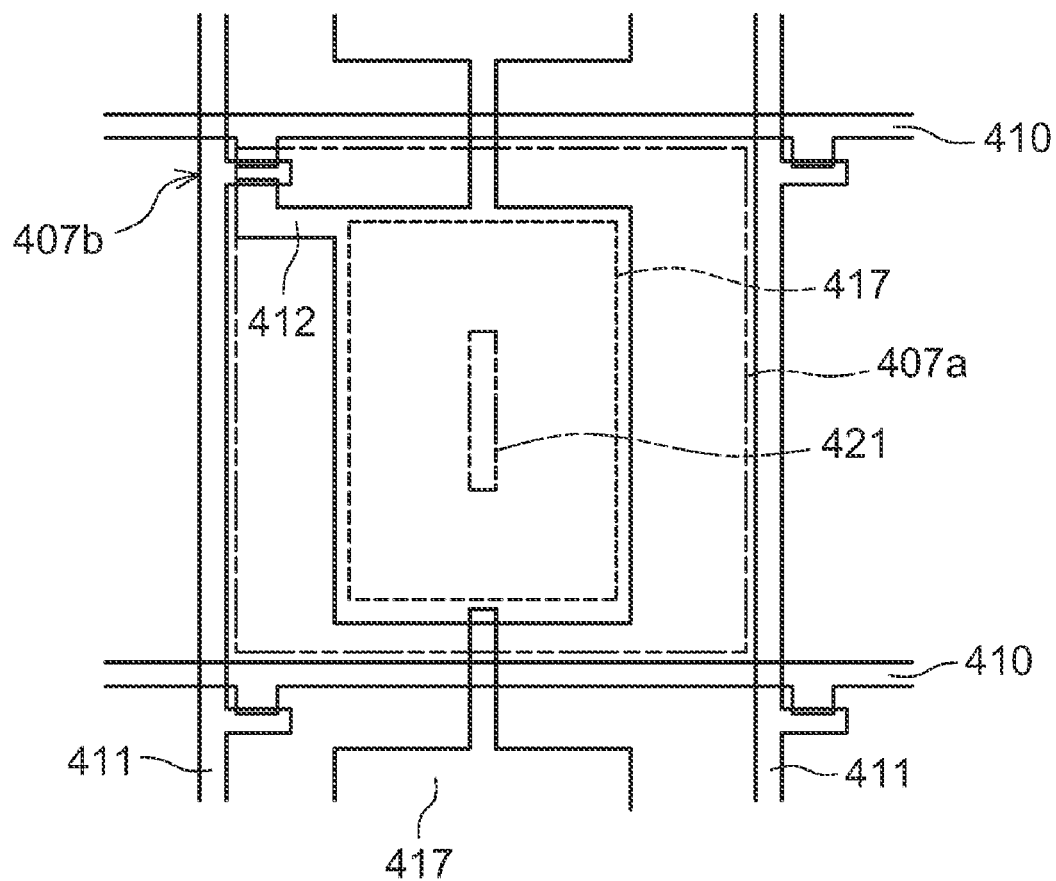
FIG. 10 is a plan view showing, in one pixel unit, a structure of the radiation detector according to the second exemplary embodiment.

FIG. 9 is a sectional view showing a structure of the radiation detector 400 in one pixel unit. FIG. 10 is a plan view showing the structure of the radiation detector 400 in the one pixel unit. The size of the one pixel shown in FIGS. 9 and 10 is about 0.1 mm×0.1 mm to 0.3 mm×0.3 mm. In the radiation detector, about 500×500 to 3000×3000 pixels are disposed in a matrix state.

As shown in FIG. 9, the active matrix substrate 450 includes the insulating substrate 408, a gate electrode 411, a charge storage capacitor electrode (hereinafter, called a Cs electrode) 418, a gate insulation film 413, a drain electrode 412, a channel layer 415, a contact electrode 416, a source electrode 410, an insulation protecting film 417, an interlayer insulating film 420, and the charge collecting electrode 407a.

Further, the switching devices 407b include a thin film transistor (TFT) configured by the gate electrode 411, the gate insulation film 413, the source electrode 410, the drain electrode 412, the channel layer 415, the contact electrode 416, and the like, arranged on the active matrix substrate 450. Further, the charge storage capacitor 407c, configured by the Cs electrode 418, the gate insulation film 413, the drain electrodes 412, and the like, is arranged on the active matrix substrate 450.

The insulating substrate 408 is a supporting substrate. An alkaline-free glass substrate, for example, (for example, Product No. 1737, and the like produced by Corning) may be used as the insulating substrate 408. As shown in FIG. 10, the gate electrodes 411 and the source electrodes 410 are electrode lines arrayed in the form of a grid. The switch devices 407b configured by the thin film transistors are formed at the intersection points of the gate electrodes 411 and the source electrodes 410.

The sources and the drains of the switch devices 407b are connected to the source electrodes 410 and the drain electrodes 412, respectively. The source electrodes 410 include rectilinear portions as signal lines and extending portion for constituting the switch devices 407b. The drain electrodes 412 are disposed to connect the switch devices 407b to the charge storage capacitors 407c.

The gate insulation film 413 is composed of SiNx, SiOx, and the like. The gate insulation film 413 is disposed to cover the gate electrodes 411 and the Cs electrodes 418. The portions positioned on the gate electrodes 411 of the gate insulation film 413 acts as gate insulation films in the switch devices 407b. Further, the portions positioned on the Cs electrodes 418 of the gate insulation film 413 acts as dielectric layers in the charge storage capacitors 407c. Namely, the charge storage capacitors 407c are formed by the superposed regions of the Cs electrodes 418 and the drain electrodes 412, each formed on the same layer as that of the gate electrodes 411. Note that, an anodized oxide film obtained by anodically oxidizing the gate electrodes 411 and the Cs electrodes 418, may also be used as the gate insulation film 413 in addition to SiNx and SiOx.

Further, the channel layer (i layer) 415 is a channel portion of the switch device 407b. The channel layer (i layer) 415 is a path of a current for connecting the source electrode 410 and the drain electrode 412. The contact electrode (n+ layer) 416 causes the source electrode 410 to contact with the drain electrode 412.

The insulation protecting film 417 is formed on approximately the entire surface of the source electrodes 410 and the drain electrode 412. Namely, the insulation protecting film 417 is formed on approximately the entire region of the insulating substrate 408. The insulation protecting film 417 protects the drain electrodes 412 and the source electrodes 410, and electrically insulates and separates the drain electrodes 412 and the source electrodes 410 from each other. Further, the insulation protecting film 417 has contact holes 421 at predetermined positions positioned above the portions facing the Cs electrodes 418 in the drain electrodes 412.

The charge collecting electrode 407a is composed of an amorphous transparent conductive/oxide film (ITO). The charge collecting electrodes 407a are formed to birdge the contact holes 421. The charge collecting electrodes 407a are layered on the source electrodes 410 and on the drain electrodes 412. The charge collecting electrodes 407a are electrically conductive to the photoconductive layer 404. The charge collecting electrodes 407a and the photoconductive layer 404 are arranged such that the charge collecting electrodes 407a can collect the charges generated in the photoconductive layer 404.

Next, the configuration of the charge collecting electrode 407a will be explained in detail. The charge collecting electrode 407a used in the exemplary embodiment is composed of the amorphous transparent conductive/oxide film (ITO). A material, which has a basic composition of Indium-Tin-Oxides (ITO), Indium-Zinc-Oxides (IZO), Indium-Tin-Germanium (IGO), and the like, may be used as a material of the amorphous transparent conductive/oxide film.

Further, various types of metal films and conductive oxide films are used as the charge collecting electrode 407a. However, transparent conductive oxide films such as ITO are often used for the charge collecting electrode 407a because of the following reason. Namely, when a large amount of X-rays is irradiated on the radiation detector 400, unnecessary charges may be captured in a semiconductor film (otherwise, in the vicinity of the interface between the semiconductor film and a layer adjacent thereto).

These remaining charges may be stored for a long time, or move in a long time. Accordingly, the remaining charges deteriorate X-rays detection characteristics when an image is detected after the remaining charges are generated, or cause occurrence of a residual image (virtual image). To cope with the above case, JP-A No. 9-9153 (corresponding to U.S. Pat. No. 5,563,421) discloses a method for eliminating remaining charges when remaining charges are generated in the photoconductive layer 404, by energizing the remaining charges by externally illuminating a light to the photoconductive layer 404. In this method, to efficiently illuminate the light from under the photoconductive layer 404 (the charge collecting electrode 407a side), the charge collecting electrode 407a must be transparent to the illuminated light.

Further, to increase the area fill factor of the charge collecting electrode 407a or to seal the switch device 407b, the charge collecting electrode 407 is formed to cover the switch device 407b. However, when the charge collecting electrode 407a is intransparent, the switch device 407b can not be observed after the charge collecting electrode 407a is formed.

Namely, when the switch device 407b is covered by the intransparent charge collecting electrode 407a, and when the testing the characteristics of the switch device 407b after the charge collecting electrode 407a is formed, and when the characteristics of the switch device 407b have some defect, the switch device 407b can not be observed by an optical microscope and the like, to solve a reason of the defect. Therefore, it is preferred that the charge collecting electrode 407a is formed transparent, so that the switch device 407b can be easily observed even after the charge collecting electrode 407a is formed.

The interlayer insulating film 420 is composed of a photosensitive acryl resin to electrically insulate and separate the switch device 407b. The contact holes 421 pass through the interlayer insulating film 420. Further, the charge collecting electrode 407a is connected to the drain electrode 412. As shown in FIG. 9, the contact hole 421 is formed in an inverted taper shape. A high voltage power supply (not shown) is connected between the bias electrode 401 and the Cs electrode 418.

Next, configuration of the cover of the photoconductive layer 404 will be explained. As shown in FIG. 7, a cover glass 440 is disposed above the bias electrode 401 as an example of a cover member for covering the bias electrode 401.

A protection member 442 to which the cover glass 440 is joined, is disposed on the insulating substrate 408. The protection member 442 surrounds the peripheral of the photoconductive layer 404. Further, the protection member 442 is formed in a box shape with its upper and lower portions opened.

Further, the protection member 442 has a side wall 442a which stands on the outer peripheral portion of the insulating substrate 408, and a flange portion 442b which extends from the upper portion of the side wall 442a toward above a central portion of the insulating substrate 408. Accordingly, the protection member 442 is formed to have an L-shaped cross section.

The upper surface of the outer peripheral portion of the cover glass 440 is joined to the lower surface (inner wall) of the flange portion 442b, and is supported by the protection member 442.

The joint portion of the protection member 442 and the cover glass 440 is disposed externally of the photoconductive layer 404. Namely, the protection member 442 is joined to the cover glass 440 in a region where the photoconductive layer 404 does not exist above the insulating substrate 408, and not above the photoconductive layer 404.

Note that, an insulating member having an insulating property is used for the protection member 442. Polycarbonate, polyethylene terephthalate (PET), poly methyl methacrylate (acryl), and polyvinyl chloride, for example, are used as the insulating member.

Further, the lower open portion of the protection member 442 is closed by the insulating substrate 408, and the upper open portion protection member 442 is closed by the cover glass 440. Accordingly, a closed space having a predetermined size is formed in the protection member 442. The photoconductive layer 404 is accommodated in the closed space, and the photoconductive layer 404 is covered by the cover glass 440, the insulating substrate 408, and the protection member 442.

Further, the space surrounded by the cover glass 440, the protection member 442, and the insulating substrate 408 is filled with a curable resin 444 as a filling member. Room temperature curable resin of, for example, epoxy, silicon, and the like, are used as the curable resin 444.

(Operation of TFT Type Radiation Detector)

Next, an operation of the TFT type radiation detector 400 will be explained.

When an X-rays imaging apparatus using the radiation detector 400 images a radiation image, the X-rays imaging apparatus supplies a predetermined bias voltage to the bias electrode 401 according to the polarity of charges of the detection target, and applies the bias voltage to the photoconductive layer 404 from the bias electrode 401. By applying the bias voltage, an electric field is generated to the photoconductive layer 404, and moves the charges having the polarity of the detection target among the charges generated in the photoconductive layer 404, to the charge collecting electrodes 407a side.

In the radiation detector 400, when X-rays are irradiated to the photoconductive layer 404, the charges (electron-hole pairs) are generated in the photoconductive layer 404. Further, when a voltage is applied between the bias electrode 401 and the Cs electrodes 418, namely, when the voltage is applied to the photoconductive layer 404 through the bias electrode 401 and the Cs electrodes 418, the photoconductive layer 404 is electrically connected in series with the charge storage capacitors 407c. Accordingly, the electrons generated in the photoconductive layer 404 moves to a + electrode side and the holes generated therein moves to a − electrode side. As a result, charges are stored to the charge storage capacitors 407c.

The charges, which are stored to the charge storage capacitors 407c, can be taken out through the source electrodes 410 by turning on the switching devices 407b in response to input signals to the gate electrodes 411. All of the electrode lines, which are configured by the gate electrodes 411 and the source electrodes 410, the switching devices 407b, and the charge storage capacitors 407c, are disposed in a matrix state. Therefore, image information of X-rays may be two-dimensionally obtained by sequentially scanning the signals input to the gate electrodes 411, and detecting a signal from each of the source electrodes 410.

When the bias voltage is applied from the bias electrode 401 when the radiation detector 400 images a radiation image, charges are also generated in the insulating substrate 408 by the electric field generated by the application of the bias voltage. In particular, since the edge portion 401A of the bias electrode 401 has a smaller number of confronting charge collecting electrodes 407a, and further a wrap-around of an electric field occurs, the edge portion 401A of the bias electrode 401 has a large charge amount.

However, the charges generated to the insulating substrate 408 flow out through the ground line also in the radiation detector according to the exemplary embodiment 400, likewise to the first exemplary embodiment. Accordingly, the potential of the conductive layer 460 is kept to the ground level. As a result, the change of an electrostatic capacitance generated between the insulating substrate 408 and the charge collecting electrodes 407a, or the Cs electrodes 418 can be suppressed. Therefore, the radiation detector 400 according to the exemplary embodiment can suppress a deterioration of the image quality of the radiation image.

Further, in the radiation detector 400 according to the exemplary embodiment, the conductive layer 460 is disposed on the other surface 408B of the insulating substrate 408. Therefore, even when the conductive layer 460 is disposed at a position near to the charge collecting electrodes 407a, a discharge between the conductive layer 460 and the charge collecting electrodes 407a can be prevented. As a result, the exemplary embodiment can reduce the size of the radiation detector 400.

In the first exemplary embodiment, a case where the conductive layer 160 is disposed to cover from the back side of the edge portion 140A of the bias electrode 140 to a region that corresponds to the back side of the edge portion 104A of the radiation detecting layer 104, has been described. Further, in the second exemplary embodiment, a case where the conductive layer 460 is disposed to cover from the back side of the edge portion 401A of the bias electrode 401 to a region that corresponds to the back side of the edge portion 404A of the photoconductive layer 404, has been described. However, the present invention is not limited thereto. As long as the conductive layer 160 and the conductive layer 460 are disposed at the portion corresponding to the back sides of the peripheral edge portions of the bias electrode 140 and the bias electrode 401, the change of the electrostatic capacitance can be suppressed. Therefore, a deterioration of the image quality of the radiation image can be suppressed by the above configuration.

Further, in the first and second exemplary embodiments, case where the conductive layer 160 and the conductive layer 460 are disposed to the substrate, has been described. However, the present invention is not limited thereto. The change of the electrostatic capacitance can be suppressed, for example, by making a holding member for holding the substrate conductive, and disposing a contact position of the holding member at the back side of the peripheral edge portion of the bias electrode.

Figure 11:
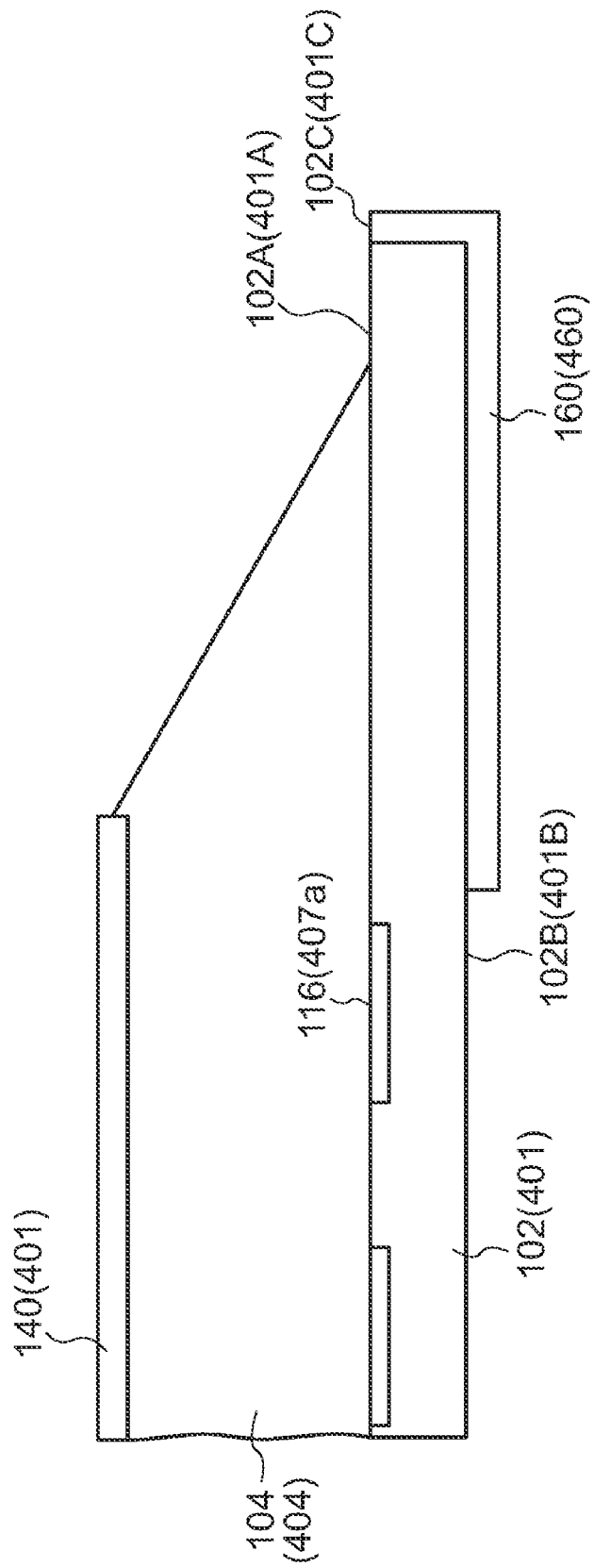
FIG. 11 is a schematic sectional view showing a configuration of an edge portion of an insulating substrate according to an another exemplary embodiment.

Further, as shown in FIG. 11, the conductive layer 160 and the conductive layer 460 may be formed up to the side surface 102C of the insulating substrate 102, and up to the side surface 408C of the insulating substrate 408. With this configuration, a change of an electrostatic capacitance between the conductive layer 160 and the conductive layer 460, and the chassis for holding the radiation detector 100 and the radiation detector 400, can be suppressed.

Figure 12:
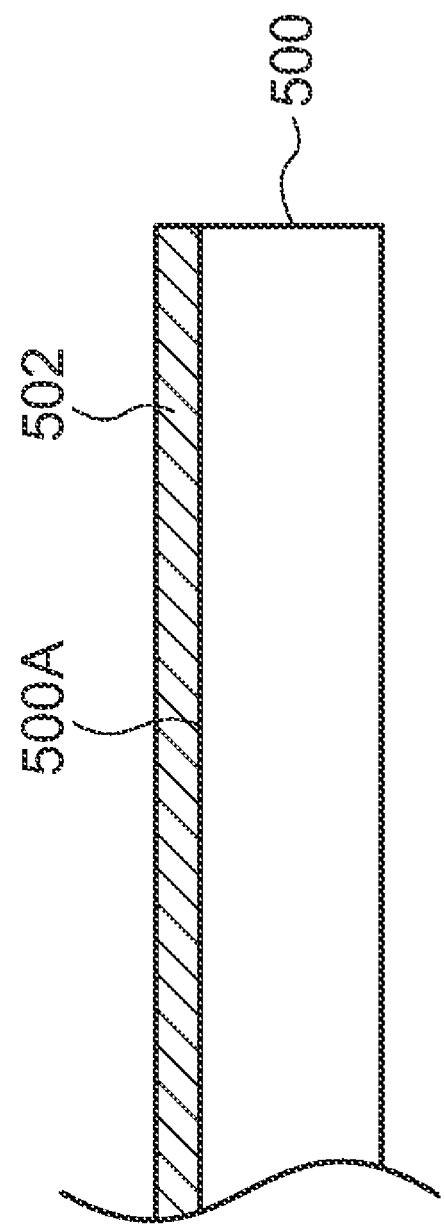
FIG. 12 is a schematic sectional view showing a configuration of a substrate according to the another exemplary embodiment.

Further, the conductive layer 160 may be formed on the other entire surface 102B of the insulating substrate 102. Further, the conductive layer 460 may be formed on the other entire surface 408B of the insulating substrate 460. Further, as shown in, for example, FIG. 12, an insulating film 502 may be formed on one surface 500A of a conductive substrate 500, and the respective layers may be formed on the insulating film 502 of the one surface 500A.

Further, in the first and second exemplary embodiments, case where the ground line is connected to the conductive layer 160 and the conductive layer 460 and the voltage levels of the conductive layer 160 and the conductive layer 460 are kept to the ground level, has been described. However, the present invention is not limited thereto. For example, the conductive layer 160 and the conductive layer 460 may be connected to a power supply line, to which power of a predetermined voltage level is supplied from a power supply device, and the voltage level of the conductive layer 160 and the conductive layer 460 may be kept to the predetermined voltage level.

Further, in the first and second exemplary embodiments, case that the ground line is connected to the conductive layer 160 and the conductive layer 460, has been described. However, the present invention is not limited thereto. When, for example, the charges generated in the conductive layer 160 and the conductive layer 460 are uniformly dispersed therein without existing eccentrically, and the change of the electrostatic capacitance is suppressed, the conductive layer 160 and the conductive layer 460 are not necessarily to be connected to the ground line or the like.

Further, the X-rays may be irradiated from one surface or the other surface of the insulating substrate.

In addition, the members and the materials, which are used in the light reading type radiation detector, may be applied to the corresponding portions having the same functions in the TFT type radiation detector. Likewise, the members and the materials, which are used in the TFT type radiation detector, may be applied to the corresponding portions having the same functions in the light reading type radiation detector. Further, the present invention is not limited to the exemplary embodiments, and may be variously modified, changed, and improved.

What is claimed is:
1. A radiation detector comprising:
a substrate formed in a flat plate form and having a first surface provided with an insulating property;

a plurality of collecting electrodes, disposed on the first surface of the substrate, that collects charges;

a semiconductor layer, formed on the plurality of collecting electrodes, that generates charges when radiation is irradiated;

a bias electrode, formed on the semiconductor layer, that applies a bias voltage for generating an electric field for moving charges having a polarity of a detection target among the generated charges, to the collecting electrodes; and a conductive layer, composed of a conductive member, disposed on a second surface of the substrate at a portion corresponding to a peripheral edge portion of the bias electrode.

2. The radiation detector of claim 1, wherein the conductive layer is disposed to cover, from the edge portion of the bias electrode, a region of the second surface of the substrate that corresponds to an edge portion of the semiconductor layer.

3. The radiation detector of claim 1, wherein the conductive layer is disposed to cover the entire second surface of the substrate.

4. The radiation detector of claim 1, wherein the conductive layer is connected to a potential maintaining section that maintains a voltage level of the conductive layer at a predetermined voltage level.

5. The radiation detector of claim 4, wherein the potential maintaining section is arranged as a ground line connected to the ground, and the predetermined voltage level is set to a ground level.

6. The radiation detector of claim 1, wherein the substrate and the conductive layer have a light transmitting property.

7. The radiation detector of claim 1, wherein the conductive layer is further disposed on a side surface of the substrate.

8. The radiation detector of claim 1, wherein the radiation detector is used for mammography in which breast radiation imaging is carried out.

* * * * *